United States Patent
Yang et al.

(10) Patent No.: US 7,453,850 B2
(45) Date of Patent: Nov. 18, 2008

(54) APPARATUS, AND ASSOCIATED METHOD, FOR FACILITATING BI-DIRECTIONAL ROUTING OF DATA IN A PACKET RADIO COMMUNICATION SYSTEM

(75) Inventors: Mingguey Michael Yang, Plano, TX (US); Vinod Kumar Choyi, Plano, TX (US)

(73) Assignee: Alcatel Lucent, Paris (FR)

( * ) Notice: Subject to any disclaimer, the term of this patent is extended or adjusted under 35 U.S.C. 154(b) by 955 days.

(21) Appl. No.: 10/325,057

(22) Filed: Dec. 20, 2002

(65) Prior Publication Data

US 2004/0120294 A1  Jun. 24, 2004

(51) Int. Cl.
*H04Q 7/00* (2006.01)
(52) U.S. Cl. ..................................... 370/331
(58) Field of Classification Search ................ 370/328, 370/331, 338
See application file for complete search history.

(56) References Cited

U.S. PATENT DOCUMENTS

| | | | | |
|---|---|---|---|---|
| 6,195,705 | B1 * | 2/2001 | Leung | 709/245 |
| 6,856,624 | B2 * | 2/2005 | Magret | 370/392 |
| 2001/0046223 | A1 * | 11/2001 | Malki et al. | 370/338 |
| 2002/0009066 | A1 * | 1/2002 | Shimizu et al. | 370/338 |

FOREIGN PATENT DOCUMENTS

EP  1 235 413 A2  8/2002
EP  1235413 A2 *  8/2002

OTHER PUBLICATIONS

Vaarala; Mobile IP NAT/NAPT/Firewall Traversal; IETF Network Working Group; Jul. 12, 2001; pp. 1-21.
Perkins, et al.; Using DHCP with Computers That Move; Wireless Networks; ACM; US; Oct. 1, 1995; pp. 341-353; vol. 1, No. 3.
Information Sciences Institute; Internet Protocol, DARPA Internet Program, Protocol Specification; IETF RFC 791; Sep. 1981; pp. 1-45.
Egevang, et al.; The IP Network Address Translator (NAT); IETF Network Working Group, RFC 1631; May 1994; pp. 1-9.
Rekhter, et al.; Address Allocation for Private Internets; IETF Network Working Group, RFC 1918; Feb. 1996; pp. 1-8.
C. Perkins; IP Encapsulation Within IP; IETF Network Working Group, RFC 2003; Oct. 1996; pp. 1-13.
R. Droms; Dynamic Host Configuration Protocol; IETF Network Working Group, RFC 2131; Mar. 1997; pp. 1-39.
Srisuresh, et al.; IP Network Address Translator (NAT) Terminology and Considerations; IETF Network Working Group, RFC 2663; Aug. 1999; pp. 1-26.

(Continued)

*Primary Examiner*—Hassan Kizou
*Assistant Examiner*—Bo Hui A Zhu (57) ABSTRACT

Apparatus, and an associated method, for facilitating routing of packet-formatted data in a packet radio communication system. When a mobile node roams out of its home network and into a foreign network, data routing is facilitated. A UPA (unique private address) tunnel, is selectably formed between the mobile node and a foreign agent. And, a UDP/MIP (User Datagram Protocol/Mobile IP) tunnel is selectably formed between the foreign agent and a home agent. Problems otherwise associated with the private address conflict and NAT/NAPT device traversal are avoided.

18 Claims, 8 Drawing Sheets

OTHER PUBLICATIONS

Fox, et al.; Virtual Private Networks Identifier; IETF Network Working Group, RFC 2685; Sep. 1999; pp. 1-6.
G. Montenegro; Reverse Tunneling for Mobile IP, revised; IETF Network Working Group, RFC 3024; Jan. 2001; pp. 1-26.
C. Perkins; IP Mobility Support for IPv4; IETF Network Working Group, RFC 3220; Jan. 2002; pp. 1-85.
Levkowetz. et al.; Mobile IP NAT/NAPT Traversal Using UDP Tunnelling; IETF Task Force; Internet Draft; Apr. 5, 2002: pp. 1-26.

* cited by examiner

APPARATUS, AND ASSOCIATED METHOD, FOR FACILITATING BI-DIRECTIONAL ROUTING OF DATA IN A PACKET RADIO COMMUNICATION SYSTEM

The present invention relates generally to communication of packet-formatted data in a packet radio communication system. More particularly, the present invention relates to apparatus, and an associated method, by which to provide for bi-directional communication of the data with a mobile node, positioned in a foreign network, served by a Mobile IPv4 foreign agent and identified by a care-of address (CoA). A mechanism is provided by which two separate data channels are formed to provide for the bi-directional communication of data with the mobile node. NAT/NAPT (network address translations/network address port translation)—device traversal and private address conflict resolution is provided.

BACKGROUND OF THE INVENTION

The need to communicate data is a necessary adjunct of modern society. The communication of data is effectuated through the use of a communication system. As scientific discovery, and technological advancement, has permitted, new types of communication systems have been developed and implemented. Such technological advancements continue. And, new, as well as improvements to existing, communication systems are regularly made.

Advancements in digital communication techniques are amongst the technological advancements that have permitted the introduction of new types of communication systems, capable of providing many varied communication services.

A radio communication system is exemplary of a communication system that has benefited as a result of advancements in digital communication techniques, as well as other technological advancements. In a radio communication system, communication channels are defined upon a radio-link that forms at least a portion of a communication path extending between the communication stations of the radio communication system.

A radio communication system is generally implementable more economically than a wireline counterpart as the infrastructure costs associated with a radio communication system are generally less than the costs associated with installation of a network infrastructure of a wireline communication system. Additionally, a radio communication system can be implemented as a mobile communication system, permitting of mobile communications. Communications in such a system are possible, from and between, locations at which the use of a conventional, wireline communication system would be impractical.

The use of digital communication techniques in a communication system permits improved efficiency of communications relative to the use of conventional, analog communication techniques. Typically, when digital communication techniques are utilized, data that is to be communicated is digitized and then formatted, such as into packetized form as data packets.

Protocols have been developed, and standardized, relating to packet-based communications. The internet protocol (IP) is exemplary of a packet-based communication standard, regularly utilized to effectuate packet-based communications. Standards relating to the internet protocol include, e.g., the IPv4 and IPv6 versions. In these versions of the internet protocol, operational parameters, as well as logical configuration of the IP network are defined.

The IPv4 protocol was developed, initially, primarily for use in a wireline network, such as an office intranet, or a network connected through the internet. A logical device, referred to as a node, is identified by an IP address.

When the node is a device that is fixedly connected by way of a wireline connection to other portions of a communication network, the node is fixedly connected in a network, or subnetwork.

Increasingly, though, packet-based communications, including communications effectuated by way of the internet, are effectuated with mobile nodes rather than fixed nodes. The routing of data to a mobile node becomes more problematical, particularly when the mobile node roams into a subnetwork, referred to as a visited or foreign network, other than the network, referred to as the home network, with which the mobile node is normally associated. The mobile node shares its subnet prefix with the home network.

Additionally, due to the paucity of IPv4 addresses, networks are sometimes configured as private networks and nodes, including mobile nodes, thereof, are configured with private addresses. The IETF (internet engineering task force) request for comments (RFC) 1918 provides a definition of private addresses, which are unregistered IPv4 addresses that can be used by any network. A network configuration that utilizes private addresses is well-suited for networks that do not require extensive external connections, such as to the internet.

A node, or host, of a private network cannot communicate directly with nodes or devices external to the private network because the IP address associated therewith is a private address. Private addresses are nonroutable. At times herein, a node designed with a private address is referred to as a private node. When a private node is to communicate with a node external to the private network, i.e., an external node, a network address translation (NAT) device is used to map the private IP address of the node to an external address, which is reserved by NAT exclusively for this purpose.

Various implementations of NAT devices are used. For instance, traditional (outbound) NAT devices are sometimes used. Such devices provide only for unidirectional communication of data outbound from the private network. A device, referred to as a twice NAT device translates both source and destination addresses as an IP packet crosses addresses realms. And, an NAPT (network address port translation) device performs translation operations in which a set of internal nodes are able to share a single external address and be identified by a transport protocol identifier, e.g., TCP (transport control protocol) and UDP port numbers.

One problem of significance occurs when a private node roams to a foreign network, or otherwise crosses networks, during communications with another node. A Mobile IPv4 standard has been promulgated that is intended to permit a mobile node (MN) to communicate with other nodes by using the home IP address of the mobile node, even while the mobile node roams outside of its home network. IP packet tunneling is utilized to permit such operation. For example, IP-in-IP encapsulation between a Mobile IP home agent (HA) located at the home network associated with the mobile node, and the care-of address (CoA) of the mobile node can be used to tunnel data packets.

However, tunneling may fail if an NAPT device is positioned in the path of the tunneling. The tunneling mechanism that is utilized, e.g., IP-in-IP encapsulation, generally does not contain enough information to permit the NAPT device to make a unique address translation. Additionally, private address conflict might exist. That is, more than one node might have the same private IP address. If a private mobile node roams into a foreign network and its home address IP address is in conflict with the address of a fixed or mobile node in the foreign network or other visiting mobile node(s), then an address conflict results. When an address conflict occurs, the Mobile IP foreign agent of the foreign network is unable to route incoming data packets to the appropriate receiving node. Additionally, the foreign agent is unable correctly to route outgoing packets from the mobile node, involved in the address conflict, to the appropriate home agent associated with the mobile node.

Various proposals have been set forth to attempt to overcome this problem. For instance, a reverse tunneling (RT) mechanism has been proposed. A reverse tunneling mechanism is proposed, for instance, in RFC 3024 promulgated by the IETF. And, a private address extension to Mobile IP (MIP TUP) has been proposed. And, Mobile IP NAT/NAPT device traversal using UDP tunneling (MIP UDP) has also been proposed.

Each of the proposed solutions is inadequate in some regard. For instance, the reverse tunneling mechanism (RT) is available for use in reverse NAT device traversal only. In the presence of an NAPT device, the encapsulation method used by the reverse tunneling mechanism does not include the source port number of the mobile node that is needed by the NAPT device for unique address translation of the care-of address of the mobile node. Additionally, the reverse tunneling mechanism does not deal with the problem associated with address conflicts.

And, although the MIP TUP mechanism provides for NAT device traversal and also provides a solution to the address conflict problem, this mechanism fails to support NAPT device traversal. Additionally, the MIP TUP mechanism provides for a nested, two-level, tunnel from the home agent to the foreign agent, necessitating a large overhead component to forward data packets to the mobile node.

The MIP UDP tunneling mechanism provides both NAT device and NAPT device traversal as well as also avoids the address conflict problem. However, this mechanism works only for mobile nodes operating with a co-located care-of address. In addition, it requires mobile nodes, including public mobile nodes, to employ UDP tunneling for so long as the mobile nodes are communicating "behind" the NAT device or NAPT device. If the foreign network has a foreign agent configured with a public address, then the public mobile nodes are able to use regular Mobile IP forward and reverse tunneling of data traffic, and thus avoid the overhead necessitated of UDP tunneling.

Accordingly, if a manner could be provided by which better to provide for routing of data packets in a packet radio communication system that provides for mobile node mobility, improved communications would be possible.

It is in light of this background information related to communications in a packet radio communication system that the significant improvements of the present invention have evolved.

SUMMARY OF THE INVENTION

The present invention, accordingly, advantageously provides apparatus, and an associated method, by which to communicate packet-formatted data in a packet radio communication system.

Through operation of an embodiment of the present invention, a manner is provided by which to provide for bi-directional communication of the data with a mobile node, positioned in a foreign network, and identified by the mobile node's home IP address and its care-of address.

A mechanism is provided by which two separate data tunnels are formed to provide for the bi-directional communication of data with the mobile node. NAT/NAPT (network address translation/network address port translation) device transversal and private address conflict resolution is provided.

In one aspect of the present invention, an alternative data tunneling mechanism of the MIP UDP-type is provided. NAT device and NAPT device traversal is provided for the communication of data packets communicated with mobile nodes that operate with care of addresses of foreign agents. Private address conflict is also avoided on the home addresses of the mobile nodes. A protocol complementary to existing MIP UDP mechanism is provided.

NAT/NAPT device traversal and private-address conflict avoidance is provided through the selective use of two separate tunnels through which to communicate data packets in both of the forward and reverse directions. A UPA (unique private address) tunnel is formed between the mobile node and a foreign agent only when there is address conflict of the home address of the mobile node, which is a private address. The UPA tunnel is a unique tunnel between the foreign agent and the mobile node identified by its UPA. And, the UPA tunnel operates in manners analogous to a temporary unique private address (TUP) defined pursuant to an existing MIP TUP mechanism in that a mobile node involved in an address conflict is instructed by a foreign agent to use a unique private address (UPA) for tunneling data packets between the mobile node and the foreign agent. The unique private address is allocated, for instance, by the foreign agent to the mobile node. Or, the unique private address is, for instance, acquired by the mobile node from a DHCP server associated with the foreign network at which the mobile node is resident. And, between the foreign agent and the home agent of the home network of the mobile node, a UDP/MIP tunnel, analogous to that set forth in the existing MIP UDP mechanism, is used only when the foreign agent is positioned behind a NAT/NAPT device, i.e., the foreign agent care-of address is a private address.

The UPA tunneling is used to overcome private address conflicts. And, UDP/MIP tunneling is used to provide for NAT/NAPT device traversal. Accordingly, if no address conflict with respect to the home address of the mobile node exists, UPA tunneling is not required between the mobile node and the foreign agent. And, if the foreign agent has a public address that is available to be used as the care-of address of the mobile node, the UDP/MIP tunneling is not required. An MIP UPA protocol is thereby provided.

The MIP UPA protocol with a reverse tunneling mechanism facilitates communication in that the new MIP UPA protocol provides for forward and reverse NAT and NAPT traversal through the use of UDP/MIP tunneling. In contrast, the RT mechanism provides only for reverse NAT traversal through use of a tunnel between the foreign agent and the home agent. And, the MIP UPA protocol of an embodiment of the present invention avoids private address conflict through the use of a UPA tunnel between the mobile node and the foreign agent. The reverse tunneling mechanism fails to provide resolution for the private address conflict.

The MIP UPA protocol of an embodiment of the present invention also differs with the MIP TUP mechanism in that the MIP TUP mechanism provides only for NAT traversal, through the use of a two-level, nested tunnel between the home agent and the foreign agent for forward data-packet traffic and the first tunnel from the foreign agent to the home agent as that of the reverse tunnel mechanism for reverse data traffic. In contrast, the MIP UPA protocol provides for both NAT device and NAPT device traversal through the use of UDP/MIP tunneling in the forward and reverse directions between the home agent and the foreign agent.

The differences between the MIP UPA protocol and the MIP UDP protocol are described as follows. The MIP UPA protocol provides both NAT device and NAPT device traversal. UDP/MIP tunneling is used in the forward and reverse data traffic directions between the home agent and the foreign agent. The MIP UDP protocol also provides NAT and NAPT device traversal by using the UDP/MIP tunneling in the forward and reverse data traffic directions between the home agent and the co-located care-of address of the mobile node. That is to say, the foreign agent is not involved in data delivery when the MIP UDP protocol is used. The MIP UPA protocol deals with the problem of private address conflict through the use of the UPA tunnel between the mobile node and the foreign agent. In contrast, the MIP UDP protocol deals with the private address conflicts by demanding, of each mobile node roaming behind the NAT/NAPT device, the mobile node to acquire and operate with a co-located care-of address, which is a unique private address within the foreign network, even if there is no address conflict.

In these and other aspects, therefore, apparatus, and an associated method, is provided for a packet radio communication system. The packet radio communication system has a mobile network having a mobile node operable in a home network and moveable to a foreign network. The home network has a home agent associated therewith, and the foreign network has a foreign agent associated therewith. The mobile node is selectably identified by a nonuniversal identifier address. Bi-directional routing of data with the mobile node when the mobile node is positioned at the foreign network is facilitated. A determiner is located at the foreign network. The determiner determines whether the mobile node is identified by the non-universal identifier address. A message generator is operable responsive to determinations made by the determiner that the mobile node is identified by the nonuniversal identifier. The message generator generates a message for communication to the mobile node. The message at least alerts the mobile node to obtain a unique private address if there is an address conflict. The unique private address is used to form a first data tunnel between the mobile node and the foreign agent.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
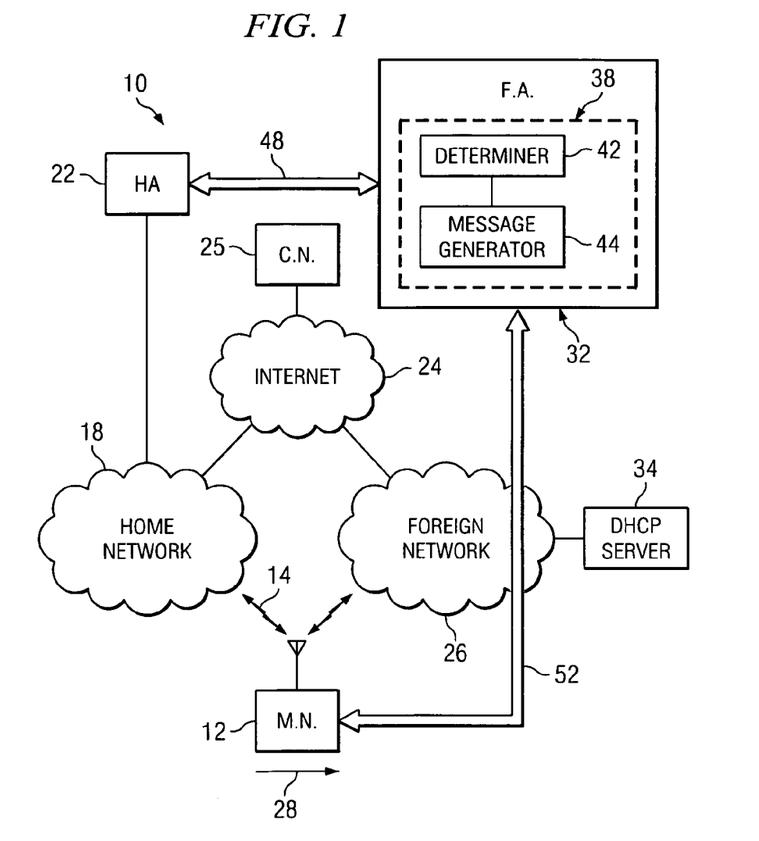
FIG. 1 illustrates a functional block diagram of a communication system in which an embodiment of the present invention is operable.

Referring first to FIG. 1, a communication system, shown generally at 10, provides for radio communications with mobile nodes, of which the mobile node 12 is representative. The mobile nodes form nodes of a communication network, here a radio network in which data is communicated between the mobile node and another correspondent entity 25 by way of communication paths that include radio links, such as the radio link 14. Packet-formatted data is communicated with the mobile nodes by way of the radio link. In the exemplary implementation, the communication system forms an IP (internet protocol) communication system, operable pursuant to the IPv4 protocol.

While the following description shall be described with respect to the exemplary implementation in which the communication system forms a Mobile IP communication system, it should be understood that the teachings of the present invention can analogously be implemented in any of many other types of packet-based radio communication systems. And, while the communication system, and the elements forming portions thereof, are functionally represented, the functional elements shown here to form the communication system can be implemented in any desired manner not only as-shown but also in other manners.

Here, the communication system includes a network part here formed of a home network 18 that forms a home network associated with the mobile node. A functional entity, referred to as a home agent 22, is associated with the home network. The home agent performs various support functions to facilitate communications with mobile nodes that are associated with the home network 18. The home network is connected to a core, or other packet-based, network, here the internet 24. A correspondent node 25, with which the mobile node 12 exchanges data, is also represented in the Figure.

And, the network part of the communication system here further illustrates a foreign network 26 to which the mobile node roams in movement from the home network indicated by the arrow 28, thereafter to be capable of communication by way of the foreign network. A foreign agent 32 is associated with the foreign network. Analogous to the home agent 22, the foreign agent provides various support functions to facilitate communication at, or through, the foreign network. A DHCP server 34 associated with the foreign network is also shown in the figure.

As noted previously, when the mobile node is identified with a private address, routing of packet data to, and from, the mobile node becomes problematical when the mobile node roams out of its home network and into a foreign network. The present invention provides a manner by which to facilitate routing of data packets to and from the mobile node addressed by its private home address when the mobile node is associated with the foreign network, here the foreign network 26. Here, the foreign agent includes apparatus 38 of an embodiment of the present invention. The apparatus includes functional elements that are implementable in any desired manner. The functional elements are implemented, for instance, as algorithms executable by processing circuitry. And, here, the apparatus 38 is shown to be formed of a determiner 42 and a message generator 44.

During operation of an embodiment of the present invention, separate tunnels, here a data tunnel 48 is formed between the home agent 22 and the foreign agent 32, and a data tunnel 52 is formed between the mobile node 12 and the foreign agent 32, when the mobile node 12 is roaming in the foreign network. Through the formation of the data tunnel 52, packet data is routable to and from the mobile node when an address conflict exists between the mobile node and another device associated with the foreign network. Through the formation of the data tunnel 48, packet data is routable to and from the mobile node when the foreign agent is positioned behind a NAT device or a NAPT device.

When the mobile node 12 roams out of its home network 18 and into the foreign network, the mobile node discovers the foreign agent 32. And, the mobile node requests Mobile IPv4 support from the home agent 22 by sending a registration message to the home agent via the foreign agent. After receiving a Mobile IPv4 registration request (RRQ) message from the mobile node, the foreign agent 32 first determines whether the home IP address of the mobile node is a private address. If the home IP address of the mobile node is a public address, then the foreign agent proceeds to forward the registration request to the home agent. If, conversely, the home IP address of the mobile node is a private address, then the foreign agent checks whether the private home address of the mobile node is in conflict with other nodes of the foreign network, either fixed or mobile. Such determination is here represented to be performed by the determiner 42.

If an address conflict exists, then the foreign agent determines whether the mobile node has a UPA as its new identity to resolve the address conflict. The foreign agent performs this determination by determining whether the source address of the RRQ is the UPA of the mobile node and the UPA is the same as the UPA contained in a UPA extension attached to the RRQ. If so, the foreign agent proceeds to forward the registration request to the home agent 22. If, however, the mobile node does not have a UPA, the foreign agent rejects the registration request by sending a response to the mobile node with a denial code that indicates the occurrence of the address conflicts. The response is here represented to be generated by the message generator 44. The message includes an extension, referred to as a unique private address (UPA) extension that is attached to the response. The UPA extension contains, for instance, the UPA assigned to the mobile node, provided the foreign agent is capable of reserving a set of unique private addresses (UPAs) and assigning a UPA from the set which has not been already assigned to another mobile node. Or, the foreign agent is able to acquire a UPA from the DHCP server 34, thereafter to be provided to the mobile node. If the foreign agent is unable to reserve a set of the UPAs or there is no available UPA in the reserved UPAs, or the foreign agent is unable to acquire a UPA from the DHCP server, then the UPA extension does not contain the UPA. If the UPA is provided, the mobile node must use the assigned UPA. Otherwise, the mobile node must acquire a unique private IP address from the DHCP server of the foreign network as the UPA of the mobile node. The UPA extension also informs the mobile node as to what encapsulation methods the foreign agent supports for the UPA tunneling.

Figure 2:
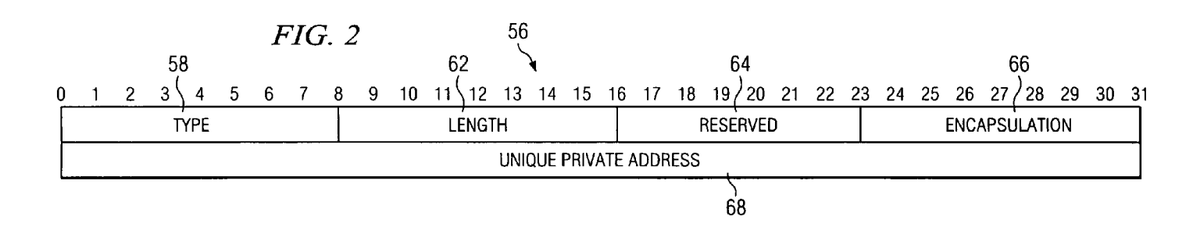
FIG. 2 illustrates an exemplary message format of a unique private address extension message selectably generated during operation of an embodiment of the present invention.

FIG. 2 illustrates an exemplary message, shown generally at 56, formed by the message generator 44 responsive to a registration request. The message includes a type field 58, a length field 62, a reserved field 64, an encapsulation field 66, and a unique private address field 68. The type field is of an assignable value. The length field indicates the length, in bytes, of the extension, e.g., exclusive of the type and length bytes. The reserved field is reserve and, in the meantime, is set to 0, e.g., on sending, and is ignored on reception. The encapsulation field indicates the type of tunnel data, using the same numbering as the IP header protocol field. The field is set to 0 by the foreign agent when no unique private address is available. And, the unique private address field specifies the unique private address to be used by the mobile node receiving or sending the extension. The foreign agent sets the values of the fields to 0 when no unique private address is available. Responsive thereto, the mobile node is required to obtain a UPA from the DHCP server 34.

When the mobile node receives the response denying the registration request, the mobile node checks the UPA extension 68 to see whether the mobile node has been assigned with a UPA. If a UPA has not been assigned, the mobile node acquires a UPA from the DHCP server 34 of the foreign network and then associates the UPA with one of its interfaces. Then, the mobile node re-sends the registration request with a UPA extension to the foreign agent. The attached UPA extension indicates that the mobile node is going to use the UPA for the UPA tunneling 52 and specifies which encapsulation method, e.g., IP-in-IP encapsulation is to be used for the tunneling. If the encapsulation method is not specified, i.e., the value of the encapsulation field 66 is 0, then the IP-in-IP encapsulation is default encapsulation method in the exemplary implementation.

If there is no address conflict with the home address of the mobile node, for instance, because the home address is a public address, or no other private nodes are configured with the same address, or the mobile node already has a UPA, then the foreign agent proceeds to forward the registration request to the home agent. If MIP RRQ contains a UPA extension, then the foreign agent binds the mobile node to the UPA, creates a tunnel between itself and the UPA of the mobile node, and removes the UPA extension before forwarding the registration request to the home agent.

Then, the foreign agent may have to deal with an NAT/NAPT device traversal. In one manner of dealing with the traversal, the foreign agent first detects whether the NAT/NAPT device exists between the foreign agent and the home agent. If the care-of address of the mobile node is a public address, then the address shall not be translated by the NAT/NAPT device. Thus, the need to provide the UDP/MIP tunneling 48 for the NAT/NAPT device traversal is not required. In this scenario, the foreign agent forwards the registration request free of the UDP tunnel request extension, such as set forth in the MIP UDP mechanism, to the home agent. Otherwise, the foreign agent forwards the RRQ with the UDP tunnel request extension to the home agent. This indicates that the foreign agent can handle the UDP tunneling and also specifies which encapsulation method is to be used.

An alternate operation, the foreign agent permits the home agent to detect whether the NAT/NAPT device exists therebetween. The foreign agent forwards the registration request together with the UDP tunnel request extension to the home agent. When receiving the registration request with an UDP tunnel request extension, the home agent decides whether the UDP tunneling is needed, for instance by using a mismatch between the source IP address of the registration request and the care of address of the mobile node specified in the registration request as specified in the MIP UDP mechanism.

Figure 3:
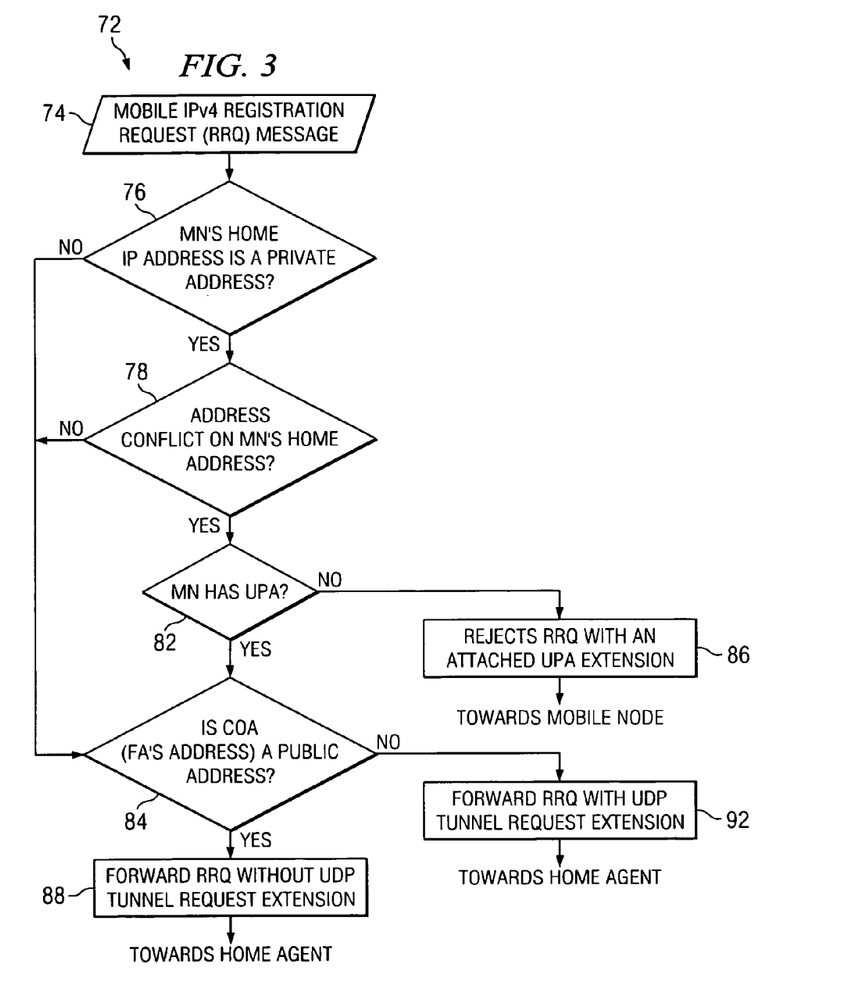
FIG. 3 illustrates a flow chart representative of operation of an embodiment of the present invention.

FIG. 3 illustrates a control diagram, shown generally at 72, representative of a procedure by which the foreign agent selectably utilizes to process a registration request sent by the mobile node. The Mobile IPv4 registration request message is received, indicated by the block 74 by the foreign agent. Then, and as indicated by the decision block 76, a determination is made as to whether the home IP address of the mobile node is a private address. If so, the yes branch is taken to decision block 78 at which a determination is made as to whether an address conflict exists. If so, the yes branch is taken therefrom to the decision block 82 at which a determination is made as to whether the mobile node has a UPA. If so, the yes branch is taken therefrom to the decision block 84. Otherwise, the no branch is taken to the block 86 and the registration request is rejected and a UPA extension is attached to the message so-generated by the foreign agent to the mobile node.

At the decision block 84, a determination is made as to whether the care-of address is a public address. If so, the yes branch is taken to the block 88 and the registration request is forwarded to the home agent without a UDP tunnel request extension. Otherwise, the no branch is taken to the block 92 and the registration request is forwarded by the foreign agent to the home agent together with a UDP tunnel request extension. No branch is taken from the decision block 76 and 78 extend to the decision block 84.

Figure 4:
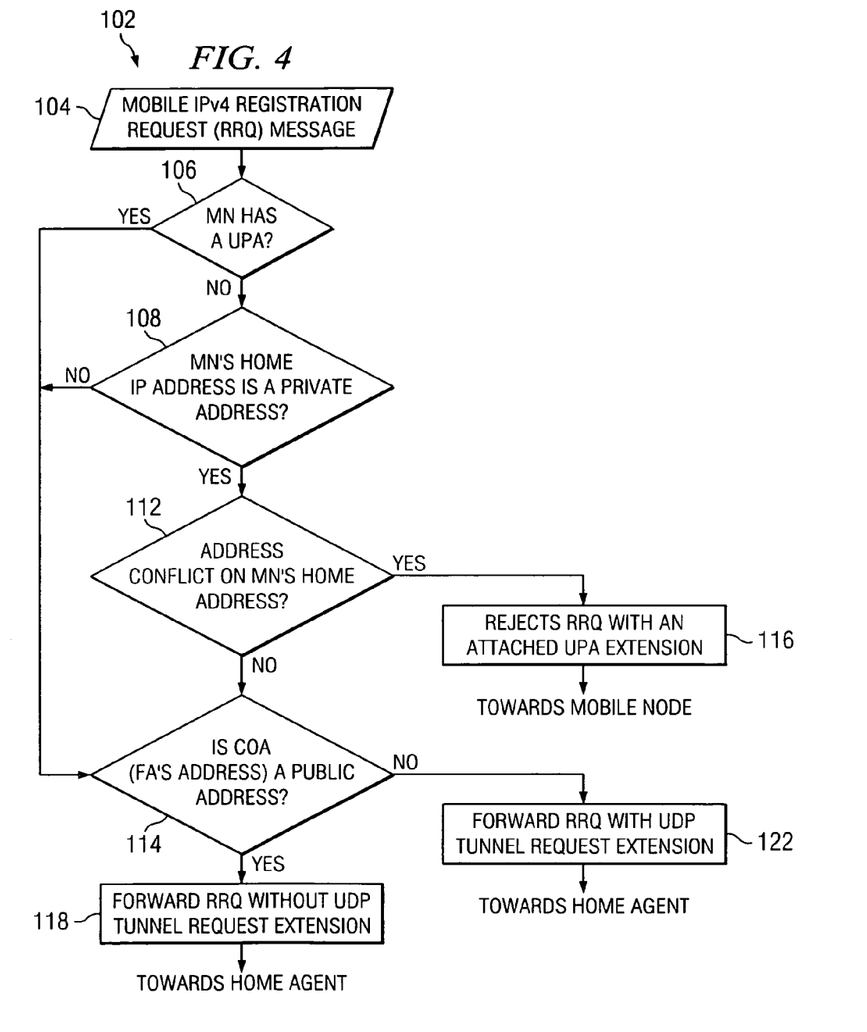
FIG. 4 illustrates a flow chart, similar to that shown in FIG. 3, but of other exemplary operation of an embodiment of the present invention.

FIG. 4 illustrates a flow diagram, shown generally at 102, representative of alternate operation of the foreign agent. Here again, after receiving the registration request, indicated by the block 104, then, at the decision block 106, a determination is made as to whether the mobile node has a UPA. If not, then the no branch is taken to the decision block 108 at which a determination is made whether the home IP address of the mobile node is a private address. If so, the yes branch is taken to the decision block 112 and a determination is made thereat as to whether an address conflict exists. If so, the no branch is taken to the decision block 114. Otherwise, the yes branch is taken to the block 116 at which the RRQ is rejected and a UPA extension is attached to the message so-generated by the foreign agent to the mobile node.

At the decision block 114, determination is made as to whether the care-of address is a public address. If so, the yes branch is taken to the block 118 and the registration request is forwarded without a UDP tunnel request extension. Otherwise, the no branch is taken to the block 122, and the registration request is forwarded to the home address together with a UDP tunnel request extension. The yes branch extending from the decision block 106 and the no branch extending from the decision block 108 also extends to the decision block 114.

When the home agent 22 receives the registration request (RRQ) together with a UDP tunnel request extension, the home agent processes the request as specified in the MIP UDP mechanism to indicate that the home agent shall use the UDP tunneling. Then the UDP tunneling 48 between the home agent and the foreign agent is used for communication of data packet. The IP-in-IP encapsulation is a default encapsulation method that is to be used, in the exemplary implementation, if not otherwise specified in the UDP tunnel request and reply extensions.

Figure 5:
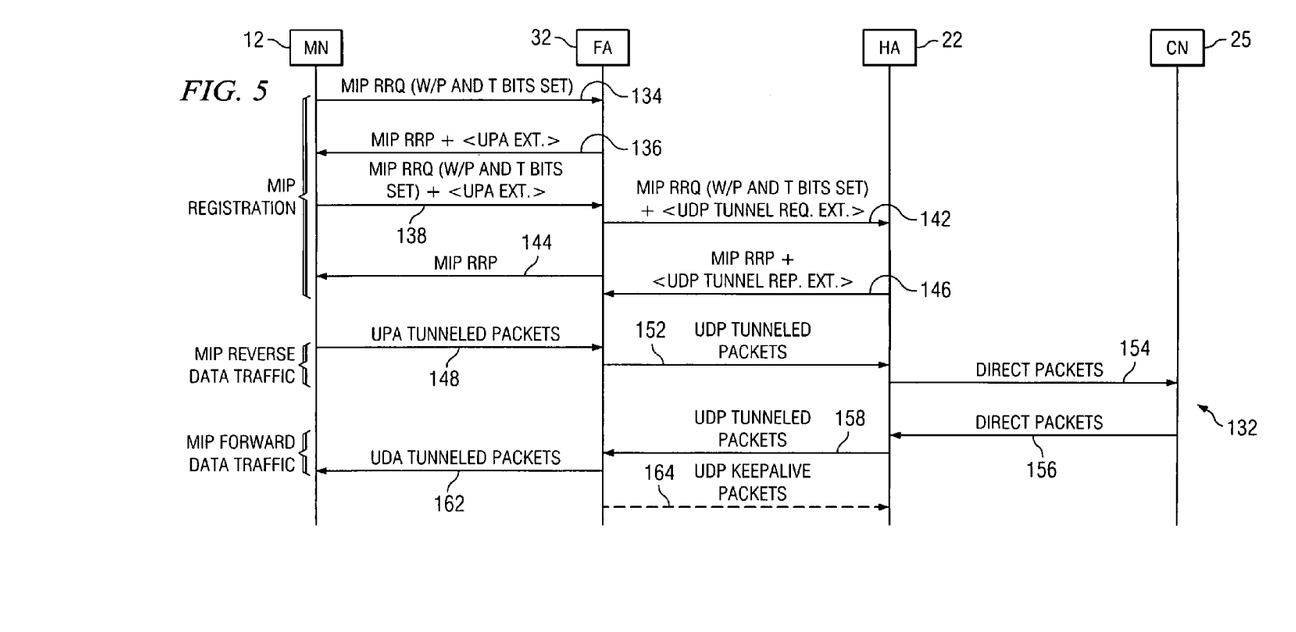
FIG. 5 illustrates a message sequence diagram representative of signaling generated and data transmission during operation of the communication system shown in FIG. 1 pursuant to an embodiment of the present invention.

FIG. 5 illustrates a message sequence diagram, shown generally at 132 representative of basic message sequencing between the mobile node 12, the foreign agent 32, the home agent 22, and a correspondent node 25.

Segments 134, 136, 138, 142, 144, and 146 are representative of signaling generated during Mobile IP (MIP) registration. The segments 148, 152, and 154 are representative of MIP reverse-direction data traffic. And, segments 156, 158, and 162 are representative of MIP forward-direction data traffic. And, the segment 164 is representative of generation of UDP keep alive packets periodically sent from the foreign agent to the home agent.

The message segments 148 and 162 here are represented to show UPA-tunneled packets.

The UPA tunneling, as noted above, between the mobile node and the foreign agent is required and used only when the home IP address of the mobile node is in conflict with another node. And, the segments 152 and 158 are representative of communication of UDP/MIP-tunneled packets. Also, as noted above, UDP/MIP tunneling 48 between the foreign agent and the home agent is needed and used only when the foreign agent is unable to provide a public address as a care-of address to mobile nodes. That is to say, when the foreign agent is behind an NAT/NAPT device and the foreign agent care-of address is a private address, the UDP/MIP tunneling is provided. The UDP keep alive packets, communicated as represented by the segments 164, are sent at selected intervals by the foreign agent to the home agent in manners set forth in the MIP UDP mechanism to maintain the UDP/MIP tunnel.

UPA tunneling is implemented by using IP-in-IP, or other, encapsulation mechanisms, between the mobile node and the foreign agent. Then the data packet that is UPA tunneled from the mobile node to the foreign agent is as follows: IP fields (encapsulating header): the source address is set to UPA of the mobile node, the destination address is set to the address of the foreign agent, and the protocol field is 4 (IP-in-IP encapsulation). The IP fields of the original header (inner header) are as follows: the source address is the home address of the mobile node and the destination address is the address of the correspondent node.

The data packet tunneled through the UPA tunnel 52 from the foreign agent to the mobile node is set as follows: IP fields (encapsulating header): the source address is set to the address of the foreign agent, the destination address is set to the UPA of the mobile node, and the protocol field is 4 (IP-in-IP encapsulation). The IP fields of the original header (inner header) are: the source address is the address of the correspondent node and the destination address is the home address of the mobile node.

If the UPA tunneling is not required, that is, when no address conflict exists, then the data traffic between the mobile node and the foreign agent is performed in conventional manner. That is to say, the forward traffic, from the foreign agent to the mobile node is handled as specified in the Mobile IPv4 protocol, such as set forth in RFC 3220, and the reverse traffic, from the mobile node to the foreign agent, is handled by using a reverse tunneling protocol, such as set forth in RFC 3024.

If UDP/MIP tunneling is implemented by using the IP-in-IP encapsulation mechanism between the foreign agent and the home agent, then the data packets tunneled from the foreign agent to the home agent are set as follows: IP fields (encapsulating header): the source address is set to the care-of address of the mobile node, the destination address is set to the address of the home agent, and the protocol field is 4 to indicate IP-in-IP encapsulation. The UDP fields (encapsulating header): the source port is set to the source port of the mobile node, selected by the mobile node, and the destination port is set to 434. The IP fields of the original header (inner header) are: the source address is the home address of the mobile node and the destination address is the address of the correspondent node.

The data packet tunneled through the UDP/MIP tunnel 48 from the home agent to the foreign agent is set as follows: IP fields (encapsulating header): the source address is set to the address of the home agent, the destination address is set to the NAT/NAPT-device-translated public address for the care-of address of the mobile node, and the protocol field is 4 indicating IP-in-IP encapsulation. The UDP fields (encapsulating header) are: the source port is set to 434 and the destination port is set to the source port of the mobile node, if passed through the NAT device, or the NAPT-device-translated port number for the source port of the mobile node, if passed through the NAPT device. The IP fields of the original header (inner header) are: the source address is the address of the correspondent node and the destination address is the home address of the mobile node.

Note that when the foreign agent receives the tunneled incoming packet passing through the NAT/NAPT device, the packet appears as: the IP fields (encapsulating header) are: the source address is the address of the home agent, the destination address is the care-of address of the mobile node, and the protocol field is 4 to indicate IP-in-IP encapsulation. The UDP fields (encapsulating header) are: the source port is 434 and the destination port is the source port of the mobile node. The IP fields of the original header (inner header) are: the source address is the address of the correspondent node, and the destination address is the home address of the mobile node.

If the UDP tunneling is not used, that is to say, no NAT/NAPT device is positioned between the foreign agent and the home agent, then the data traffic between the foreign agent and the home agent is handled, in conventional manner. That is to say, the forward traffic, between the home agent and the foreign agent, is tunneled as specified in the Mobile IPv4 protocol, such as RFC 3220. And, the reverse traffic, from the foreign agent to the home agent, is tunneled by using the reverse tunneling protocol, such as set forth in RFC 3204.

Figure 6A:
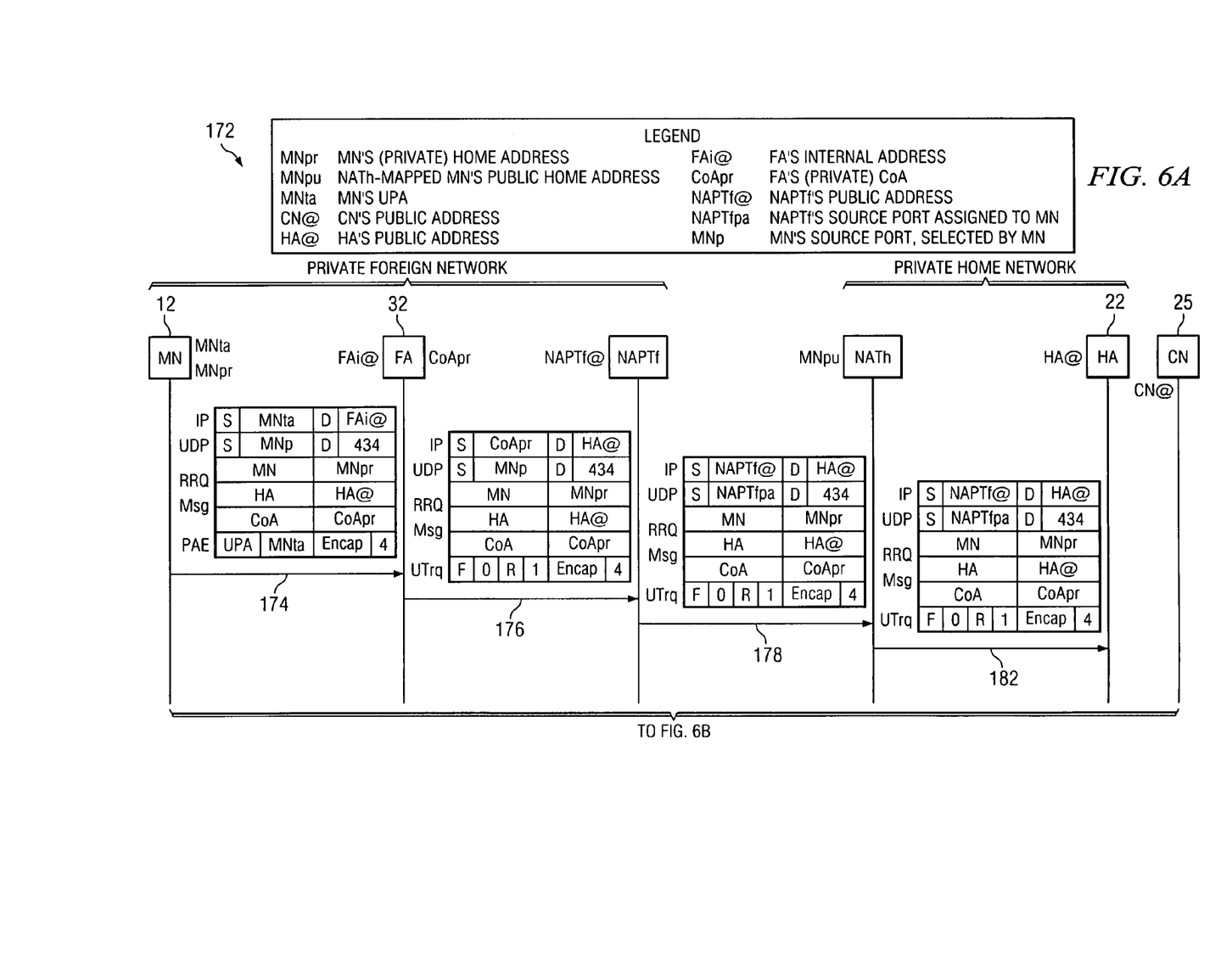
FIG. 6 illustrates a diagram representative of message flow for Mobile IP signaling generated during operation of the communication system shown in FIG. 1, here showing the separate layers of the messages.
Figure 6B:
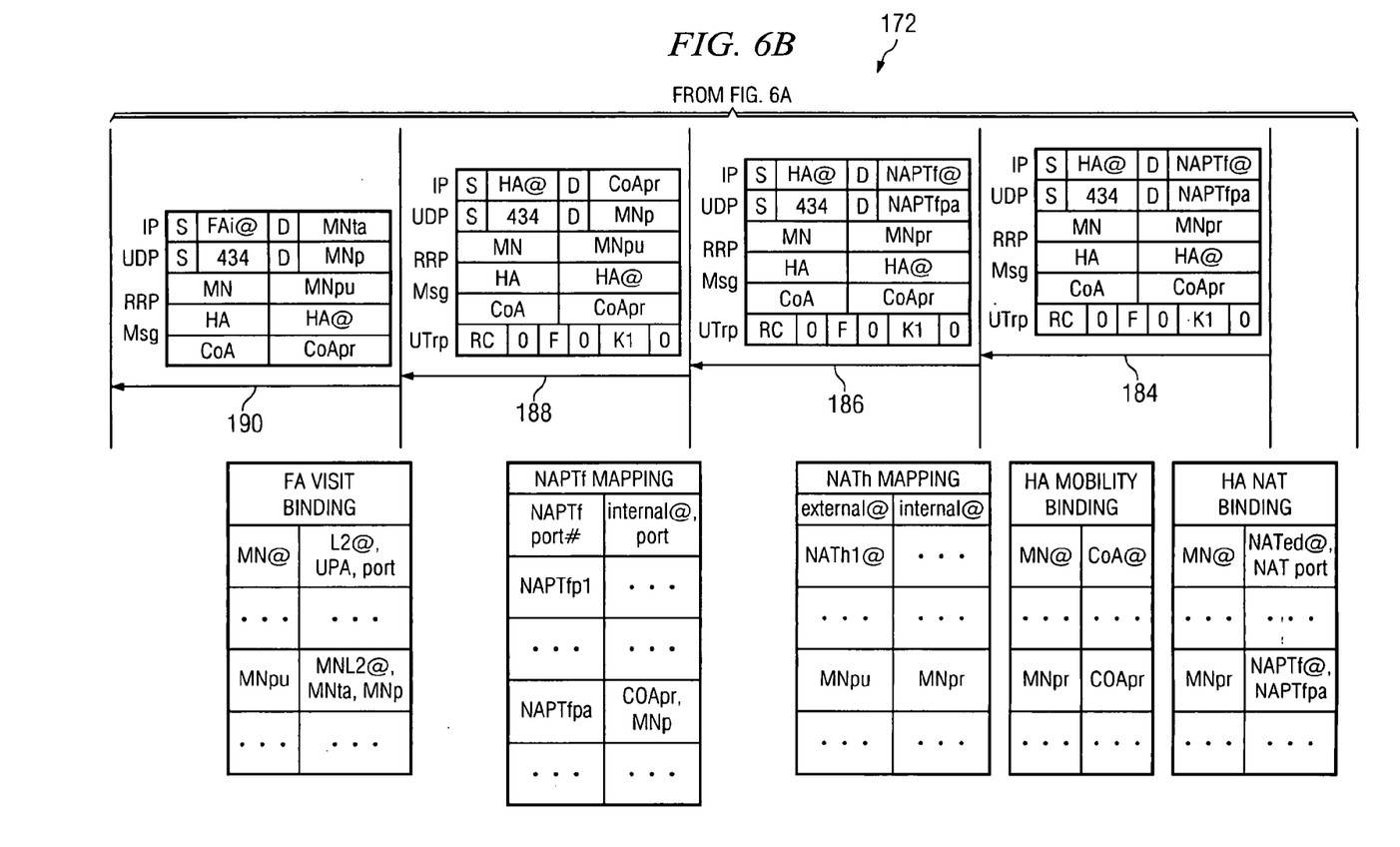

FIG. 6 illustrates a message sequence diagram, shown generally at 172, illustrating exemplary use of the MIP UPA protocol of an embodiment of the present invention for Mobile IPv4 registration. Here, the mobile node is a private mobile node that is roaming outside of its home network 18 (shown in FIG. 1). The home network is a private network that is equipped with an NAT device. The foreign network 52 to which the mobile node 12 roams is a private network equipped with an NAPT device. Here the representation is of a situation in which the home IP address of the mobile node is in conflict with other node(s) of the foreign network 52.

The message sequence diagram 172 shows the message flows, indicated by the segments 174, 176, 178, 182, 184, 186, 188, and 190 of a Mobile IP registration procedure in which the UPA, assigned or acquired, is used by the mobile node as its unambiguous identification, i.e., its IP address. Samples of resulting binding information in the foreign agent 32 and the home agent 22, together with samples of address mapping tables in the NAPT-device and the NAT-device are also represented in the figure.

Figure 7A:
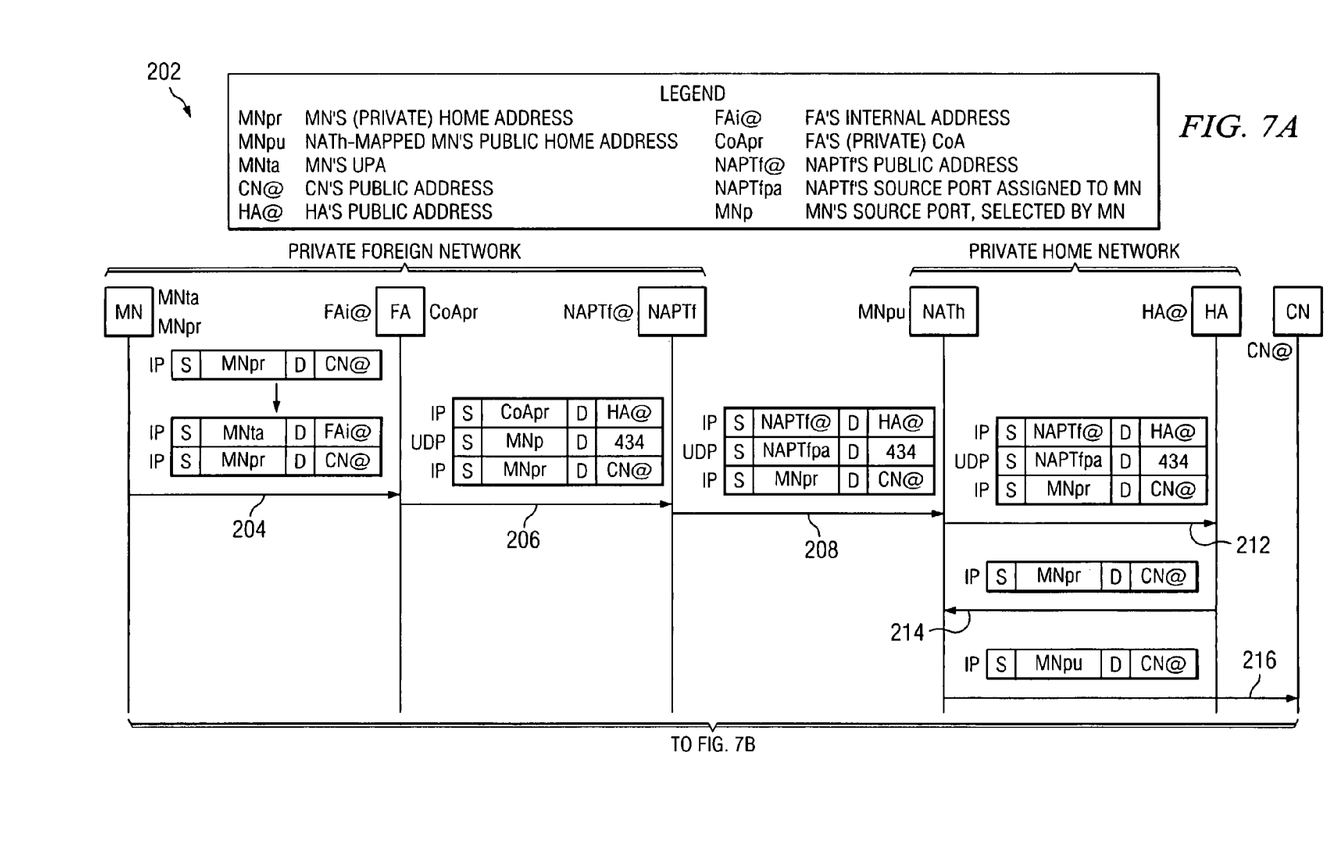
FIG. 7 illustrates a message sequence diagram for data transmission during operation of an embodiment of the present invention.
Figure 7B:
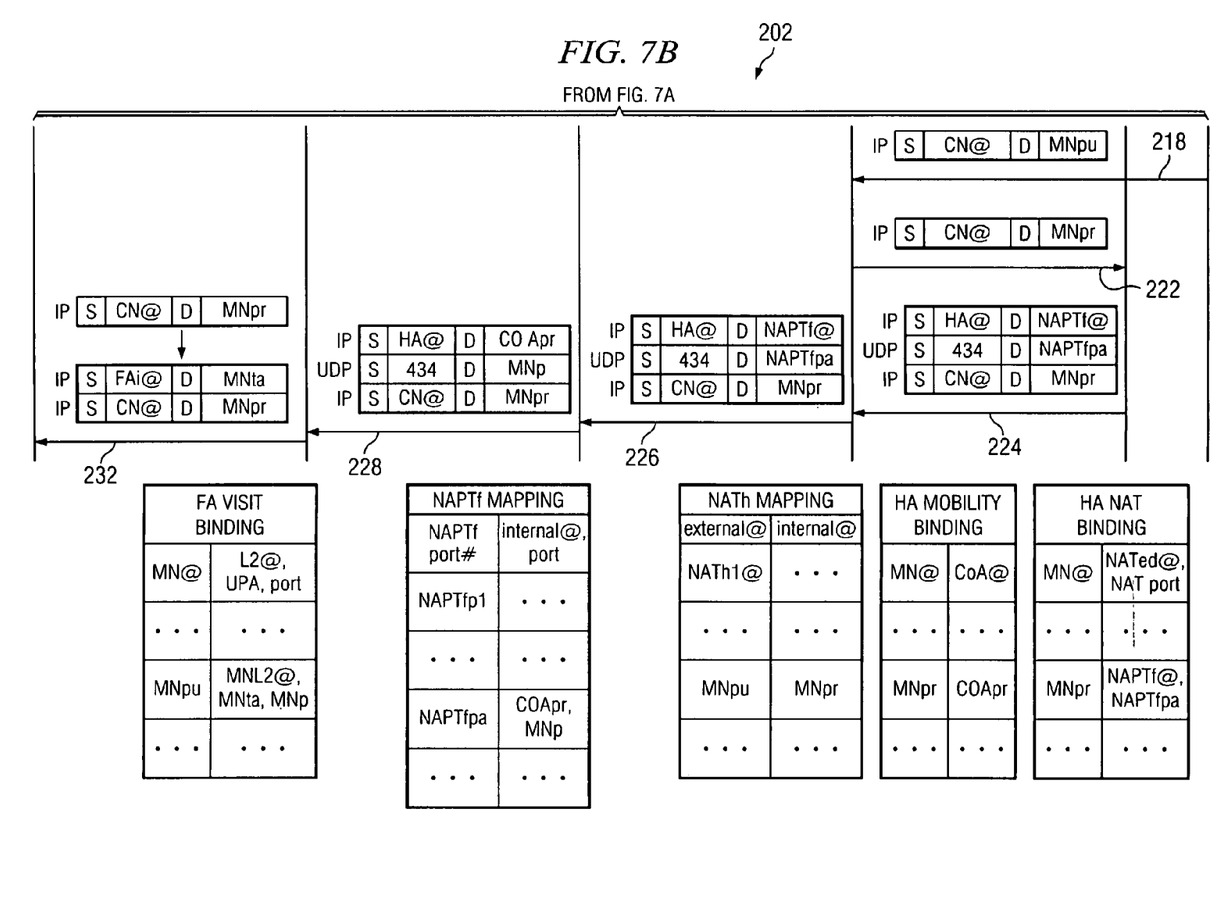

FIG. 7 illustrates a message sequence diagram, shown generally at 202, here representative of both reverse and forward data flows in which the UDP/MIP tunneling 48 between the foreign agent and the home agent is used for the NAPT-device traversal, and the UPA tunneling 52 between the foreign agent and the mobile node is used to cope with address conflict. IP-in-IP encapsulation is used for both tunnels. Here, segments 204, 206, 208, 212, 214, and 216 are representative of reverse-direction flow. And, the segments 218, 222, 224, 226, 228, and 232 are representative of forward-direction flow.

The figure illustrates that the care-of address of the mobile node (CoApr) and the port number (MNP) are translated by the NAPT device of the foreign network (NAPTf@) and one of its ports (NAPTfpa), respectively, and vice versa. If, instead, an NAT device is present in the foreign network, then the port number of the mobile node remains intact, i.e., unchanged by the NAT device in both the registration and data traffic. And, the home address of the mobile node is mapped to an NAT-assigned public address in the data traffic.

Thereby, an improved manner by which to route data between a mobile node and a correspondent node operable in a packet radio communication system is provided.

The previous descriptions are of preferred examples for implementing the invention, and the scope of the invention should not necessarily be limited by this description. The scope of the present invention is defined by the following claims:

The invention claimed is:

1. In a packet radio communication system having a mobile network comprising a home network having a home agent associated therewith and a foreign network having a foreign agent associated therewith, and a mobile node selectably identified by a nonuniversal identifier address, an apparatus for facilitating bi-directional routing of data with the mobile node when the mobile node is positioned at the foreign network, said apparatus comprising:

a determiner located at the foreign network, said determiner for determining whether the mobile node is identified by the nonuniversal identifier address and for determining whether the nonuniversal identifier address of the mobile node conflicts with the nonuniversal identifier address of other node(s) associated with the foreign network;

a message generator operably responsive to determinations made by said determiner that the mobile node is identified by the nonuniversal identifier address and the address conflict with the nonuniversal identifier address of other node(s) associated with the foreign network, said message generator for generating a message for communication with the mobile node, and wherein the message generator generates a message for alerting the mobile node to obtain a unique private address, the unique private address used to form a first data tunnel between the mobile node and the foreign agent; and wherein the foreign network of the packet radio communication system comprises a DHCP (Dynamic Host Configuration Protocol) device and wherein the message generated by said message generator causes the mobile node to obtain values of the unique private address from the DHCP device.

2. The apparatus of claim 1 wherein the message generated by said message generator includes values of the unique private address.

3. The apparatus of claim 1 wherein the mobile node selectably generates a registration request at the foreign network and wherein said determiner operates responsive to detection of generation of the registration request.

4. The apparatus of claim 3 wherein said determiner is embodied at the foreign agent, wherein the registration request selectably generated by the mobile node identifies the mobile node.

5. The apparatus of claim 4 wherein said determiner determines whether the registration request identifies the mobile node with the nonuniversal identifier address.

6. The apparatus of claim 1 wherein a first tunnel is selectably formed between the foreign agent and the mobile node.

7. The apparatus of claim 1 wherein the home network comprises a private network, wherein the nonuniversal identifier address by which the mobile node is selectably identified comprises a private address provided by the private network and wherein said determiner determines whether the mobile node is identified by the private address.

8. The apparatus of claim 1 wherein the packet radio communication system further comprises a NAT (Network Address Translation) device positioned between the foreign agent and the home agent and wherein a second data tunnel is formed between the foreign agent and the home agent, first data tunnel, and the second data tunnel used to communicate data originated at, and terminated at, the mobile node.

9. In a packet radio communication system having a mobile node, the packet radio communication system communicating packet-formatted data and having a home network and a foreign network, the home network having a home agent associated therewith and the foreign network having a foreign agent associated therewith, the mobile node selectably identified by a nonuniversal identifier address, a method for facilitating bi-directional routing of data with the mobile node when the mobile node is positioned at the foreign network, said method comprising:

determining, at the foreign network, whether the mobile node is identified by the nonuniversal identifier address, and, responsive thereto, wherein the foreign network comprises a DHCP (Dynamic Host Configuration Protocol) device; and     generating a message for communication to the mobile node, the message at least for alerting the mobile node to obtain a unique private address, the unique private address used to form a first data tunnel between the mobile node and the foreign agent; and     analyzing, at the mobile node, values contained in the message, and, selectably responsive thereto obtaining values of the unique private address from the DHCP device.

10. The method of claim 9 wherein the message generated during said operation of generating the message includes values of the unique private address.

11. The method of claim 9 further comprising the operation, prior to said operation of determining, of generating, at the mobile node, a registration request, requesting registration of the mobile node with the foreign network.

12. The method of claim 11 wherein said operation of determining comprises determining whether the registration request identifies the mobile node.

13. The method of claim 12 wherein said operation of determining comprises determining whether the registration request identifies the mobile node with the nonuniversal identifier address.

14. The method of claim 9 further comprising the operation of substituting the unique private address for the nonuniversal identifier address by which to identify the mobile node.

15. The method of claim 9 wherein the home network comprises a private network, wherein the nonuniversal identifier address by which the mobile node is selectably identified comprises a private address provided by the private network, and wherein said operation of determining comprises determining whether the mobile node is identified by the private address.

16. The method of claim 9 wherein the packet radio communication system further comprises a NAT (Network Address Translation) device positioned between the foreign agent and the home agent and wherein said method further comprises the operation of forming a second data tunnel between the foreign agent and the home agent.

17. The method of claim 16 further comprising the operation of sending data sourced at the mobile node through the first and second data tunnels.

18. The method of claim 16 further comprising the operation of sending data to be terminated at the mobile node, to the mobile node through the second and then first data tunnels.

* * * * *